Patented Apr. 9, 1935

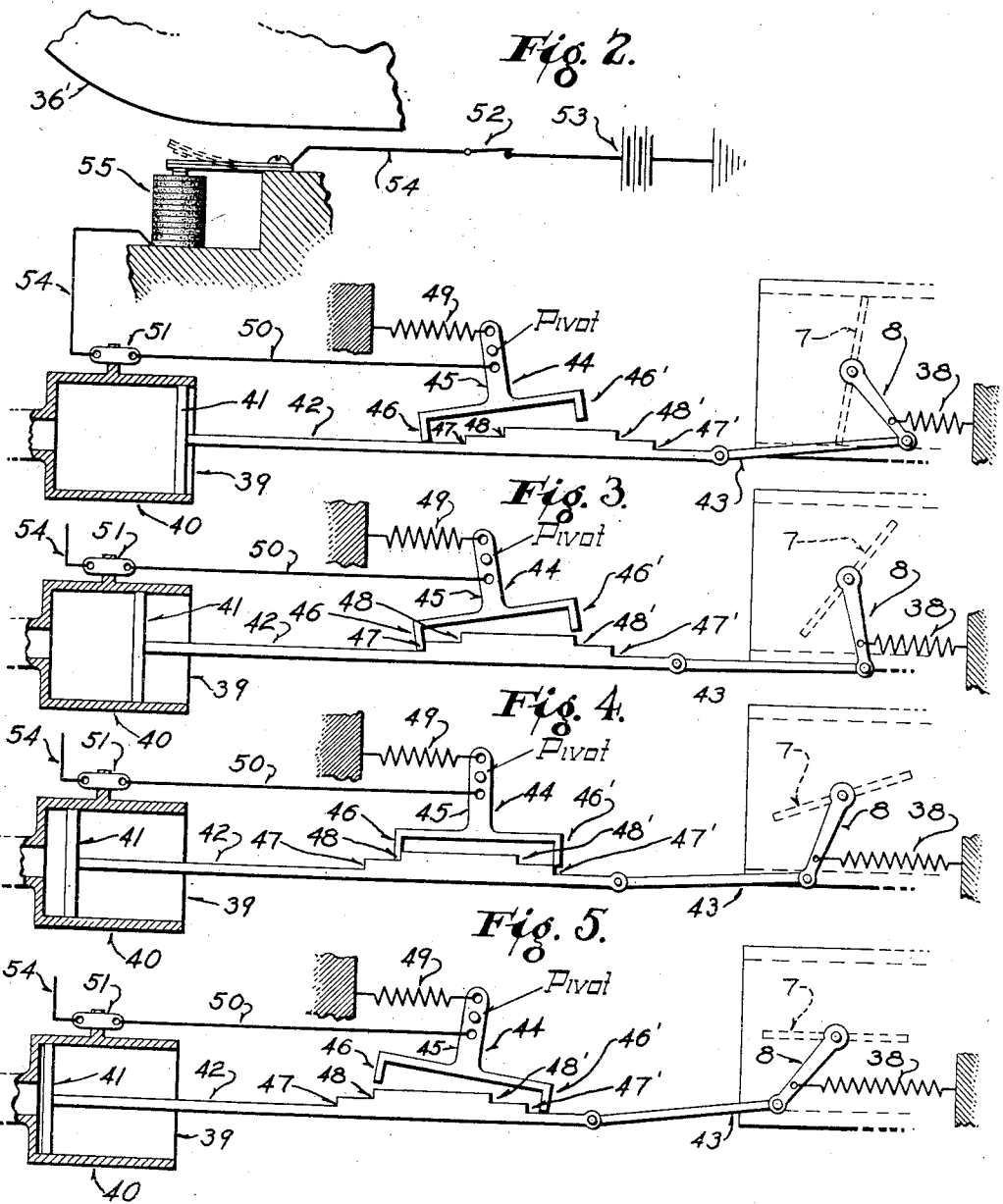

1,996,802

UNITED STATES PATENT OFFICE 1,996,802

AUTOMATIC CHOKE CONTROL

John W. Fitz Gerald, Milwaukee, Wis., assignor to Briggs & Stratton Corporation, Milwaukee, Wis., a corporation of Delaware Application June 9, 1933, Serial No. 675,013

17 Claims. (Cl. 123—179)

This invention relates to certain new and useful improvements in automatic engine starting systems and refers more particularly to means for automatically controlling the choke valve.

In the past, choke controls have been provided to automatically determine the position of the valve, but usually a bimetallic member responsive to temperature variations in some part or portion of the engine, has been employed. The movement obtained in this manner is very small, the amount of power developed is slight, and the response is slow. Hence, a very delicate instrument had to be provided.

With these and other objections to existing choke controls in mind, it is an object of this invention to provide a control in which the thermostatic element develops considerable power so as to permit its use as a prime mover, and in which the active responsive of the element is quick.

More specifically, it is an object of this invention to provide a choke control operating in accordance with the expansion and contraction of a wire through which an electric current is passed to effect the desired expansion and contraction thereof.

A further object of this invention is to provide means to control the choke valve, operable independently of the engine temperature, and also means responsive to the engine temperature to regulate the functioning of the first mentioned means.

It is also an object of this invention to provide a control for choke valves in which the expansion and contraction of a wire heated by means of an electric current passed therethrough is utilized in conjunction with some other actuating medium to limit and control the opening and closing of the choke valve thereby.

And a still further object of this invention resides in the provision of a thermostatic rheostat so connected with the choke control as to render the same inoperative upon the attainment of predetermined conditions of engine operation.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention contructed according to the best mode I have so far devised for the practical application of the principles thereof, and in which:

Figure 2 is a diagrammatic illustration of a modified embodiment of this invention; and Figures 3, 4 and 5 are diagrammatic illustrations of the actuator depicted in Figure 2 in its different positions of operation.

Figure 1:
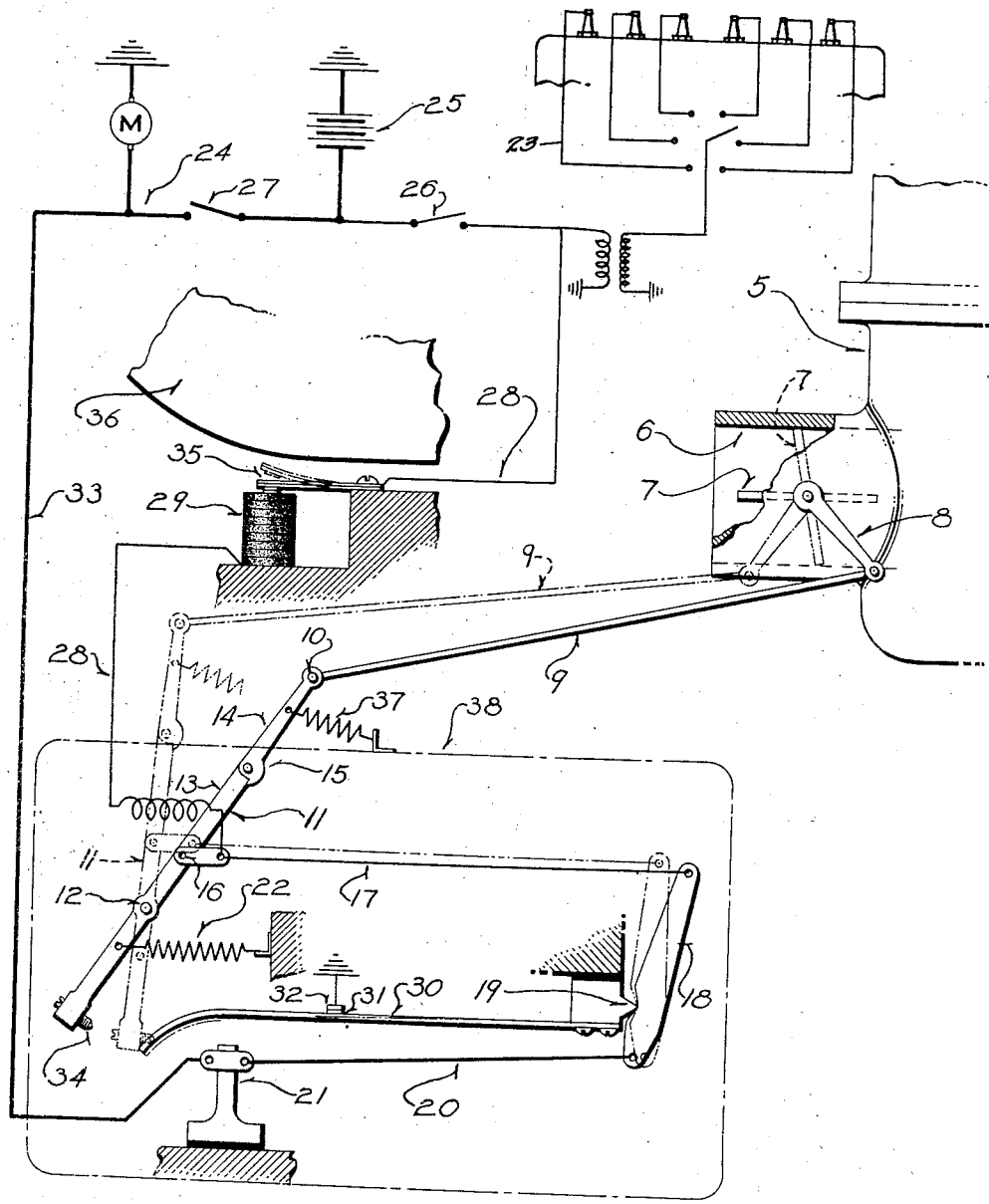
Figure 1 is a diagrammatic illustration of one embodiment of this invention.

Referring now more particularly to the accompanying drawings and especially to the embodiment illustrated in Figure 1, the numeral 5 designates a carburetor of any conventional construction having an air inlet 6 controlled by a butterfly choke valve 7. The valve 7 has an actuating lever 8 connected thereto to which one end of a link 9 is attached. The other end of the link 9 is connected as at 10 to the outer end of a lever 11 pivotally mounted at 12. The lever 11 is of sectional construction comprising an inner main section 13 and an outer end portion 14 pivotally connected by a knuckle joint 15, the sectional construction of the lever being adopted for a purpose to be later described.

Mechanically connected to the lever above its point of pivot 12, as at 16, but electrically insulated therefrom, is one end of a thermostatic wire 17. The opposite end of the wire 17 is attached to the long end of a lever 18 fulcrumed on a support 19. The short end of the lever 18 has one end of a second thermostatic wire 20 attached to it, the other end thereof being fixed to a support 21. The wires 17 and 20 are of such length that when at their normal temperatures, they maintain the lever 12 in its position depicted in full lines, against the action of a spring 22 which yieldably tends to swing the lever about its pivot toward its dotted line position closing the choke valve 7.

During starting of the engine, when it is desirable to close the choke valve, the wires 17 and 20 are heated, causing them to expand and permitting the spring 22 to function. To insure a quick action the wires are heated by the passage of electric currents therethrough, the wire 17 being connected to the ignition circuit 23 of the engine and the wire 20 being connected to the starting circuit 24. As is customary, both circuits are connected to a common source of electrical energy, specifically, a storage battery 25, one side of which is grounded, and both circuits have switches 26 and 27 respectively.

Upon closing of the ignition switch 26, as in the normal starting operation of an automobile, current flows not only through the ignition circuit, but also through a conductor 28 in which a thermostatic rheostat 29 is interposed, to the wire 17 at its point of connection with the lever 11. The opposite end of the wire being in electrical contact with the lever 18, the circuit is continued through the wire and the lever to the fulcrum 19 to which a spring arm 30 is attached.

The arm 30 carries a contact point 31 which is adapted to normally engage a stationary grounded contact point 32. Hence, the circuit for the wire 17 is completed and upon closing of the ignition switch, an amount of current determined by the rheostat 29 passes through the wire 17 and causes it to expand. The expansion of the wire 17 permits a degree of movement on the part of the lever 11 slightly closing the valve 7.

Upon closing of the starting switch, which normally takes place within but a few seconds after the closing of the ignition switch, a heavy current is permitted to pass through the wire 20, the wire 20 being connected with the starting circuit through a conductor 33. The heavy current passing through the wire 20 during the time the starting switch 27 is closed, quickly causes the wire 20 to expand and in view of the multiplication of motion obtained through the lever 18, a substantial movement is permitted on the part of the lever 11 within a short time. In practice, the motion required to effect complete closure of the choke valve is obtained within but a few seconds.

It is observed that as the lever 11 is moved to its dotted line position at which the valve 7 is completely closed, its lower end which carries an adjustable screw 34, strikes the adjacent end portion of the spring arm 30 deflecting it downwardly and disconnecting the contact points 31 and 32. Consequently, both the circuits conducting current to the wires 17 and 20 are simultaneously opened. In this manner, overheating of the wire 20, which is subjected to the heavy starting current is avoided, and if the engine fails to start as contemplated, the contraction of the wires 17 and 20 will permit their circuits to be reclosed at the contact points 31 and 32 to again bring the valve 7 to its fully closed position. This fluctuation of the lever 11 will continue as long as the starting switch 27 is held closed, which, of course, is until the engine starts.

Upon opening of the starting switch 27 as the engine starts, the wire 20 will quickly contract, returning the lever 11 toward its normal position opening the choke valve. However, inasmuch as current is still passing through the wire 17, the return of the lever and consequently the movement of the choke valve toward open position will be limited at an intermediate position.

The distance which the lever 11 moves and consequently the position of the valve 7, being in accordance with the state of expansion of the wire 17 and as the thermal condition of the wire 17 is determined by the current flowing through it, which in turn is governed by the thermostatic rheostat 29, it follows that the position of the choke valve is thereafter controlled by this rheostat 29.

Any conventional type of thermostatic rheostat may be employed, and in the present instance, it is illustrated as comprising a stack of carbon discs normally maintained in a predetermined state of compression by a bimetallic pressure arm 35 mounted from a fixed support in close proximity to an engine part, as for instance, part of the exhaust manifold 36.

The bimetallic pressure arm 35 flexes upwardly in response to a temperature rise in the manifold part 36 to gradually increase the resistance of the rheostat, and finally breaks the circuit leading to the wire 17. During the stage of increasing resistance in the rheostat, the wire 17 gradually contracts, and by the time the circuit is completely broken, the wire 17 has returned to its normal position at which the choke valve 7 is fully open.

The entire mechanism comprising the lever 11 and the wires 17 and 18, together with the mechanism connecting them with the lever is of simple rugged construction and may be encased within a suitable enclosure 38 depicted in light construction lines.

Only the outer end portion 14 of the lever projects from the enclosure and it is to obviate the possibility of injury to the mechanism by the application of force on this projecting end of the lever that the sectional construction of the lever is employed. The knuckle joint 15 prevents the application of force in a direction which would stretch the wires 17 and 20, and to hold the outer section 14 in its normal position, a light spring 37 is provided.

From the description thus far, it will be apparent that the expansion and contraction of the thermostatic wires 17 and 20 directly effects the actuation of the choke valve and that as the temperature rise in the wires is produced electrically, the response is rapid.

The expansion and contraction of a thermostatic wire in response to the passage of an electric current therethrough also may be used to control the actuation of the choke valve by an external medium as illustrated in the modified embodiment of the invention shown in Figures 2 to 5 inclusive.

In this embodiment, the choke valve 7 is yieldably held closed by a spring 38 and is adapted to be opened against the action of the spring 38 by a pressure responsive unit 39. The unit 39 may be of any desirable construction and in the present instance, is illustrated as comprising a cylinder 40 adapted to be connected with a source of engine suction (not shown) and having a piston 41 operating therein to be moved upon the establishment of a vacuum in the cylinder.

The piston 41 is connected through a rod 42 and a link 43 to the lever 8 of the choke valve so that the valve moves in direct accordance with the motion of the piston. The degree of movement of the rod 42 in response to engine suction, is controlled by a novel latch device indicated generally by the numeral 44. This device comprises a pivoted lever 45 having spaced arms 46 and 46' engageable with steps 47 and 48, and 47' and 48' respectively, formed on the rod 42 or connected thereto in any suitable manner.

A spring 49 yieldably urges the lever 45 about its point of pivot to a position holding its arm 46 in line with the step 47, the action of the spring 49 being opposed by a thermostatic wire 50 connected to the lever 45 at the opposite side of its pivot with respect to the spring 49, and attached to a rigid support 51. The thermostatic wire 50 is adapted to have an electric current passed therethrough upon closing of the ignition switch 52. The circuit established by the closing of the switch 52 for passing current to the wire 50 leads from the battery 53 through a conductor 54 in which the switch 52 and a thermostatic rheostat 55 is interposed to the wire 50 at its fixed support 51.

The thermostatic rheostat 55 is similar to the rheostat 29 illustrated in the embodiment shown in Figure 1 and is adapted to be thermally influenced by a temperature rise in the adjacent manifold part 36'.

With the parts arranged as illustrated in Figure 2, the ignition switch 52 is closed and the engine is being cranked. The switch 52 being closed causes current to flow through the wire 50 so that it is in its expanded condition allowing the spring 49 to hold the lever 45 in the position depicted.

During the cranking of the engine, the suction is insufficient to actuate the piston 41, but as the engine begins to operate under its own power, the suction increases and the rod 42 is drawn to the left a distance determined by the space between the step 47 and the arm 46. The parts come to rest in the position depicted in Figure 3 with the choke valve 7 partially open. This condition obtains until the thermostatic rheostat 55 has decreased the flow of current through the wire 50 sufficiently to enable it to contract and pull the lever 45 about its pivotal mounting to disengage its arm 46 from the step 47.

Upon disengagement of the arm 46 from the step 47, the engine suction snaps the rod 42 and consequently the valve to a further open position as determined by the engagement of the end 46 with the step 48 and upon continued contraction of the wire 50, in response to added resistance in the rheostat 55, the end of the arm 46 is finally moved out of contact with the step 48, permitting the choke valve to be fully opened as illustrated in Figure 5. The parts remain in this position as long as the engine is operating.

Upon opening of the ignition switch 52, to stop the engine, engine suction ceases and the spring 38 pulls back the rod 42 to close the choke valve 7. However, the closing movement of the valve is limited by the engagement of the step 47' with the arm 46'. In this position, the parts remain as long as the engine is inoperative; and if the switch 52 is closed and the engine restarted before its manifold part 36' cools off sufficiently to permit the thermostatic rheostat to reclose the circuit, the choke will be practically open during starting and immediately upon operation of the engine under its own power, will be completely opened.

If the engine is allowed to cool off sufficiently to permit the rheostat 55 to again close the circuit, starting of the engine will be the same as first described, that is, the wire 50 will be heated permitting the choke valve to be closed and will contract gradually to enable the choke valve to open step by step.

An advantage of the use of engine suction as a controlling medium for the choke valve is that during running conditions, a sudden opening of the throttle which results in an immediate decrease in engine suction, is accompanied, as a consequence of such decrease in engine suction, by a partial closing of the choke valve thus increasing the richness of the mixture which, of course, is desirable for quick acceleration.

From the foregoing description taken in connection with the accompanying drawings, it will be readily apparent to those skilled in the art to which this invention appertains, that this invention affords novel means for automatically controlling the choke valve of carburetors, that it entirely does away with delicate instruments and that it provides a control which is considerably more rapid in its functioning than any heretofore devised.

What I claim as my invention is:

1. A control for the choke valve of a carburetor to facilitate the starting of an internal combustion engine, comprising, actuating means mechanically connected with the choke valve, a wire mechanically connected with the actuating means and adapted to directly control the movement of the actuating means by expansion and contraction of the wire, and means to pass an electric current through the wire to cause the same to expand during the starting cycle of the engine.

2. A control for the choke valve of a carburetor on an internal combustion engine comprising mechanical means to move the choke valve, a wire mechanically connected with said means and arranged to control the movement thereof by expansion and contraction of the wire, means to pass an electric current through the wire to heat the same and cause it to expand, and means to control the flow of current through said wire.

3. In combination with the choke valve of a carburetor on an internal combustion engine, means to automatically control the position of the valve to facilitate starting of the engine comprising, means connected with the valve to move the same, a thermal element mechanically connected with said means to control the functioning thereof by expansion and contraction of said thermal element, means to pass an electric current through said thermal element to cause the same to expand during the starting operation of the engine, and means responsive to the temperature of an engine part to regulate the flow of current through said thermal element.

4. The combination with the choke valve of a carburetor on an internal combustion engine, of means to automatically control the choke valve and facilitate starting of the engine comprising, a member operable to move the choke valve, a thermal element mechanically connected with said member to hold the same against movement and adapted to have an electric current passed therethrough, passage of an electric current through said thermal element causing it to expand and permit said operating member to move, means operable by the closing of the ignition switch of the engine to cause current to flow through said thermal element, and means responsive to the temperature of an engine part to regulate the flow of current through said thermal element.

5. The combination with the choke valve of a carburetor on an internal combustion engine, of means to automatically control the choke valve and facilitate starting of the engine comprising means to move the choke valve, electrothermal means mechanically connected to said first named means to control the operation thereof, said electrothermal means being operable upon closing of the ignition switch of the engine, and means responsive to the thermal condition of an engine part to regulate the operation of the electrothermal means.

6. The combination with the choke valve of a carburetor on an internal combustion engine, of means to automatically control the choke valve and facilitate starting of the engine comprising, spring means tending to move the valve in one direction, engine operated means to move the valve in the other direction, and means to control the movement of the valve by said spring means and engine operated means comprising a latch, step-like abutments connected with a part movable with the valve and engageable with the latch, a thermal element connected with the latch and adapted to control its position with respect to the step-like abutments by expansion and contraction of said element, and means to pass an electric current through said element to heat the same and cause its expansion upon closing of the ignition switch of the engine.

7. In a control for the choke valve of a carburetor, a member connected with the valve to move the same, spring means yieldably tending to move said member in one direction, engine operated means tending to move said member in the other direction, and means to control the movement of the valve by said member comprising, a series of abutments connected with said member, a latch operable to selectively engage said abutments and hold the member and consequently the valve in different positions of movement, a thermal wire connected with said latch and adapted to control the position thereof by expansion and contraction of the wire, means to pass an electric current through the wire to heat the same, and means to regulate the flow of current through said wire.

8. In a control for the choke valve of a carburetor, a member connected with the valve to move the same, yieldable means tending to move said member in one direction, engine operated means to move the member in the other direction, a series of opposed steps connected with said member, a pivoted latch having spaced arms selectively engageable with said opposed steps to determine the limits of movement of said member by said yieldable means and said engine operated means, yieldable means tending to move said latch in one direction to engage one of its spaced arms with one of its respective steps, a thermal wire connected to the latch to move the same about its pivot in opposition to the yieldable means and to urge the latch to its position engaging the other of its spaced arms with one of its respective steps, whereby expansion and contraction of said wire effects movement of said latch, means to pass an electric current through the wire to heat the same and cause it to expand, and means to regulate the flow of current through said wire to determine its state of expansion or contraction.

9. In a control for the choke valve of a carburetor, a pivoted lever connected with the valve and operable to move the same, a spring yieldably tending to swing the lever in one direction about its pivot to move the valve toward one position, and thermal means connected with the lever at the opposite side of its pivot to oppose the action of the spring means and move the lever in its other direction, said thermal means comprising a plurality of wires adapted to have different electrical currents passed therethrough to heat the same and cause them to expand, and means to connect the wires so as to make the effect of their individual expansion and contraction upon the movement of the lever cumulative.

10. In a control for the choke valve of a carburetor, a pivoted lever connected with the valve and operable to move the same, a spring connected with the lever at one side of its pivot to yieldably tend to move the lever in one direction, and thermal means connected with the lever at the opposite side of its pivot to oppose the action of the spring and move the lever in its other direction, said thermal means comprising a plurality of wires mechanically connected in series and electrically connected with a common ground, independent electric circuits including said common ground for passing electric currents through each of the wires to cause their individual expansion and contraction, which expansion and contraction is cumulative in its effect upon the lever.

11. In a choke valve control, a pivoted lever connected with the choke valve to move the same, a spring connected to the lever at one side of its pivot to move the lever in one direction, a thermal wire connected at one end to the lever at the other side of its pivot and adapted to oppose the action of the spring and to move the lever in its opposite direction, a second pivoted lever connected to the opposite end of the thermal wire, a second thermal wire having one end connected to the second pivoted lever and its other end connected to a fixed support, electric circuit means connected to said thermal wires to conduct independent electric currents to said wires, and common means connected with said wires to complete the circuits whereby current flows through said wires and causes them to expand.

12. In a control for the choke valve of a carburetor on an internal combustion engine having an ignition circuit and a starting circuit, a pivoted lever connected with the choke valve to move the same, spring means connected with the lever at one side of its pivot to move the same in one direction, a thermal element connected to the lever at the opposite side of its pivot to oppose the action of the spring means and move the lever in its other direction, said thermal element comprising a plurality of thermal wires mechanically connected in series, a common electrical ground for said wires, means to cause an electric current to flow through one of said wires upon closing of the ignition circuit to effect a degree of expansion in said wire whereby the pivoted lever moves a predetermined distance, and means to pass electric current through another of said wires upon closing of the starting circuit to increase the movement of the pivoted lever.

13. In a control for the choke valve of a carburetor on an internal combustion engine having an ignition circuit and a starting circuit, a pivoted lever connected with the choke valve to move the same, spring means connected with the lever at one side of its pivot to move the same in one direction, a thermal element connected to the lever at the opposite side of its pivot to oppose the action of the spring means and move the lever in its other direction, said thermal element comprising a plurality of thermal wires mechanically connected in series, a common electrical ground for said wires, means to cause an electric current to flow through one of said wires upon closing of the ignition circuit to effect a degree of expansion in said wire whereby the pivoted lever moves a predetermined distance, means to pass electric current through another of said wires upon closing of the starting circuit to increase the movement of the pivoted lever, and means operable to disrupt the common ground and thereby interrupt the flow of electric current through the wires upon a predetermined movement of said lever in response to expansion of the wires.

14. A control for the choke valve of a carburetor on an internal combustion engine comprising, yieldable mechanical means to close the choke valve, engine suction operated means acting in opposition to said yieldable means to open the choke valve, thermally responsive means, and a connection between the thermally responsive means and said first two mentioned means, whereby the thermally responsive means controls the functioning of said first two mentioned means.

15. A control for the choke valve of a carburetor on an internal combustion engine comprising, a spring connected with the valve and tending at all times to close the same, a member movable by engine suction and connected with said valve whereby upon creation of a predetermined degree of engine suction, the valve is opened in opposition to the spring, thermal means, and a connection between the thermal means and said member, whereby to control the movement of said member in response to engine suction.

16. A control for the choke valve of a carburetor on an internal combustion engine comprising, a spring connected with the valve and tending at all times to close the same, a member movable by engine suction and connected with said valve whereby upon creation of a predetermined degree of engine suction, the valve is opened in opposition to the spring, and means to control the movement of said member in response to engine suction including a taut wire, and means to pass an electric current through said wire to cause the same to expand.

17. A control for the choke valve of a carburetor of an internal combustion engine, comprising a spring connected with the valve and tending at all times to close the valve, engine suction operated means connected with the valve to overcome said spring and open the valve, electrothermal means, means to connect the electrothermal means with said engine suction operated means whereby the electrothermal means controls the functioning of the engine suction operated means, and thermal means responsive to temperature changes in an engine part to regulate the functioning of the electrothermal means.

JOHN W. FITZ GERALD.